US009424884B2

(12) United States Patent
Jones

(10) Patent No.: US 9,424,884 B2
(45) Date of Patent: Aug. 23, 2016

(54) CONTENT SHUFFLING SYSTEM AND METHOD

(76) Inventor: David D. Jones, St. Paul, MN (US)

( * ) Notice: Subject to any disclaimer, the term of this patent is extended or adjusted under 35 U.S.C. 154(b) by 2069 days.

(21) Appl. No.: 12/226,157

(22) PCT Filed: Apr. 24, 2007

(86) PCT No.: PCT/US2007/009859

§ 371 (c)(1), (2), (4) Date: Oct. 9, 2008

(87) PCT Pub. No.: WO2007/127171

PCT Pub. Date: Nov. 8, 2007

(65) Prior Publication Data

US 2009/0193478 A1 Jul. 30, 2009

Related U.S. Application Data

(60) Provisional application No. 60/794,338, filed on Apr. 24, 2006.

(51) Int. Cl.

| | |
|---|---|
| ***G11B 27/10*** | (2006.01) |
| ***G11B 27/034*** | (2006.01) |
| ***H04N 21/472*** | (2011.01) |

(52) U.S. Cl.

CPC ............ *G11B 27/105* (2013.01); *G11B 27/034* (2013.01); *H04N 21/47202* (2013.01)

(58) Field of Classification Search

USPC .............................................. 725/37–39, 105

See application file for complete search history.

(56) References Cited

U.S. PATENT DOCUMENTS

| | | | |
|---|---|---|---|
| 4,775,935 | A | 10/1988 | Yourick |
| 4,863,384 | A | 9/1989 | Slade |
| 5,109,482 | A | 4/1992 | Bohrman |
| 5,434,678 | A | 7/1995 | Abecassis |
| 5,630,006 | A | 5/1997 | Hirayama et al. |
| 5,666,554 | A | 9/1997 | Tanaka |
| 5,693,902 | A | 12/1997 | Hufford et al. |
| 5,742,283 | A | 4/1998 | Kim |
| 5,877,445 | A | 3/1999 | Hufford et al. |
| 5,913,013 | A | 6/1999 | Abecassis |

(Continued)

FOREIGN PATENT DOCUMENTS

| | | |
|---|---|---|
| WO | 2009052553 A1 | 4/2009 |

OTHER PUBLICATIONS

"EMF Institute: HPSCHD", from http://emfinstitute.emf.org/exhibits/hpschd.html, visited Mar. 7, 2006 (1 page).

(Continued)

*Primary Examiner* — John Schnurr
*Assistant Examiner* — Christine Kurien
(74) *Attorney, Agent, or Firm* — Kinney & Lange, P.A.

(57) ABSTRACT

A video system (10) includes a digital viewing device (22) having a display (32), a plurality of discrete video clips that are each associated with a first stack, and a video clip display sequencer defining an order for sequential display of the video clips in the first stack on the display (32) of the digital viewing device (22). The video clips in the first stack are unrelated to each other in terms of plot, and associations of each of the video clips with the first stack are selectively defined using the digital viewing device (22). At least a portion of the order for sequential display is determined substantially randomly by the digital viewing device (22).

20 Claims, 3 Drawing Sheets

(56) References Cited

U.S. PATENT DOCUMENTS

| | | | | |
|---|---|---|---|---|
| 5,987,211 | A | 11/1999 | Abecassis | |
| 6,151,444 | A | 11/2000 | Abecassis | |
| 6,269,216 | B1 | 7/2001 | Abecassis | |
| 6,281,421 | B1 | 8/2001 | Kawaguchi | |
| 6,360,055 | B1 | 3/2002 | Kaneshige et al. | |
| 6,395,969 | B1 | 5/2002 | Fuhrer | |
| 6,504,990 | B1 | 1/2003 | Abecassis | |
| 6,738,075 | B1 | 5/2004 | Torres et al. | |
| 6,782,550 | B1 * | 8/2004 | Cao | 725/39 |
| 6,795,808 | B1 | 9/2004 | Strubbe et al. | |
| 6,807,367 | B1 | 10/2004 | Durlach | |
| 6,987,925 | B2 | 1/2006 | Kinzer et al. | |
| 6,987,961 | B1 * | 1/2006 | Pothana | 455/412.1 |
| 7,010,213 | B2 | 3/2006 | Yeend et al. | |
| 7,085,844 | B2 | 8/2006 | Thompson | |
| 7,674,169 | B2 | 3/2010 | Libby et al. | |
| 7,984,377 | B2 | 7/2011 | Ma et al. | |
| 2002/0105529 | A1 | 8/2002 | Bowser et al. | |
| 2002/0106191 | A1 * | 8/2002 | Betz et al. | 386/70 |
| 2003/0093790 | A1 * | 5/2003 | Logan et al. | 725/38 |
| 2006/0205516 | A1 | 9/2006 | Yeend et al. | |
| 2009/0085918 | A1 | 4/2009 | Hollingworth et al. | |
| 2009/0240736 | A1 | 9/2009 | Crist | |
| 2012/0131465 | A1 | 5/2012 | Telek et al. | |

OTHER PUBLICATIONS

"Amazon.com: Cinematic: Software", from http://www.amazon.com, visited Mar. 7, 2006 (3 pages).

"Mediamatic.net—Mediamatic Interactive Film Labs", from http://www.mediamatic.net/set-9637-en.html, visited Mar. 7, 2006 (5 pages).

"Mediamatic.net—The Korsakow System?!", from http://www.mediamatic.net/article-9276-en.html, visited Mar. 7, 2006 (6 pages).

"Who Can I Play 50+ Movie Clips in a Random Order", from http://www.actionscript.org, visited Mar. 7, 2006 (4 pages).

"Cut-up technique—Wikipedia, the free encyclopedia", from http://en.wikipedia.org/wiki/Cut-up, visited Mar. 7, 2006 (4 pages).

"Exquisite corpse" Wikipedia, from http://en.wikipedia.org/wiki/Exquisite_corpse, visited Mar. 7, 2006 (2 pages).

"A Silicon Hemingway—Artificial Author Brutus.1 Generates Betrayal by Bits", Science Daily, from http://sciencedaily.com/releases/1998/03/980312075430.html, visited Mar. 9, 2006 (2 pages).

* cited by examiner

Fig. 3A

INDEX

1. SHARING COFFEE
2. TIPPING - 1
3. TIPPING - 2
4. TIPPING - 3
5. SPILT MILK
6. WAITING IN LINE
7. SUGAR
8. NAMES
9. DREAM SEQUENCE
10. TREADMILL ALONE
11. FULL CHURCH
12. EXISTENTIAL AEROBICS
13. HAMMER
14. JEAN DESPREZ
15. LESLIE
16. CHOIR
17. BEAUTY
18. CHOIR ON BUS
19. HAPPY BIRTHDAY (2ND VERSE)
20. ONE LAST STORY

Fig. 3B

WOULD YOU LIKE TO RE-PLAY A SEQUENCE? NO YES IF YES, ENTER SEQUENCE ID ________ BROWSE

Fig. 3C

LIST ANY SCENES YOU WANT TO EXCLUDE (NUMBERS, SEPARATED BY COMMAS): 6, 9, 15

Fig. 3D

ENTER SCENE NUMBERS YOU WANT IN A PARTICULAR SEQUENCE OF PLAY:

| YOUR CHOICE: | 19 | | | | | | | | | | | | | | | | 16 | X | X | X |
|---|---|---|---|---|---|---|---|---|---|---|---|---|---|---|---|---|---|---|---|---|
| ORDER OF PLAY: | 1 | 2 | 3 | 4 | 5 | 6 | 7 | 8 | 9 | 10 | 11 | 12 | 13 | 14 | 15 | 16 | 17 | 18 | 19 | 20 |

Fig. 3E

SHUFFLE

SCENE SEQUENCE SELECTED: 19 8 2 13 12 17 1 10 4 18 20 3 11 5 7 14 16 __ __ __

Fig. 3F

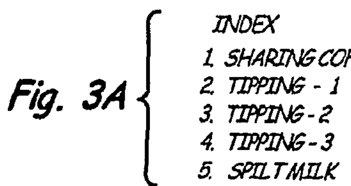

PAUSE

RESUME

SEQUENCE ID: ________

CONTENT SHUFFLING SYSTEM AND METHOD

BACKGROUND

The present invention relates to content delivery systems, and, more particularly, to a video content shuffling system and method.

Digital viewing devices such as personal computers, BlackBerry® devices, telephones (e.g., cellular phones or land-line phones), iPod® devices, game boxes (e.g., Xbox®, Wii®, etc.), TVs and the like have become increasingly popular. It is desired to provide unique content viewing experiences to users of such devices.

SUMMARY

A video system includes a digital viewing device having a display, a plurality of discrete video clips that are each associated with a first stack, and a video clip display sequencer defining an order for sequential display of the video clips in the first stack on the display of the digital viewing device. The video clips in the first stack are unrelated to each other in terms of plot, and associations of each of the video clips with the first stack are selectively defined using the digital viewing device. At least a portion of the order for sequential display is determined substantially randomly by the digital viewing device. Also disclosed is a method for providing video-based entertainment.

BRIEF DESCRIPTION OF THE DRAWINGS

FIG. 3 is a schematic representation of various menu displays utilized for the process illustrated in the flow chart of FIG. 2.

DETAILED DESCRIPTION

The present invention provides a content shuffling system and method to provide for the creation, distribution and delivery of content in a manner that involves random ordering of discrete content items (or clips). While primarily discussed in the context of video content, it will be appreciated that the present invention is readily amenable to use with audio, textual, and other types of content.

This application claims priority to U.S. Provisional Pat. App. No. 60/794,338; filed Apr. 24, 2006, which is hereby incorporated by reference in its entirety.

Video-Shuffle refers to a system for displaying video content according to the present invention. A "stack" is a collection of video clips. Video-Shuffle allows stacks of video clips to be randomly played to create a unique "movie" (i.e., a seamless viewable sequence of clips), which can be displayed on any suitable digital viewing device. Suitable digital viewing devices for such "movies" include personal computers (e.g., desktops and laptops), personal digital assistants (PDAs), BlackBerry® devices, telephones (e.g., cellular phones or land-line phones), iPod® devices (and other similar portable audio/video devices), game boxes (e.g., Xbox®, Wii®, etc.), TVs and the like.

Figure 1:
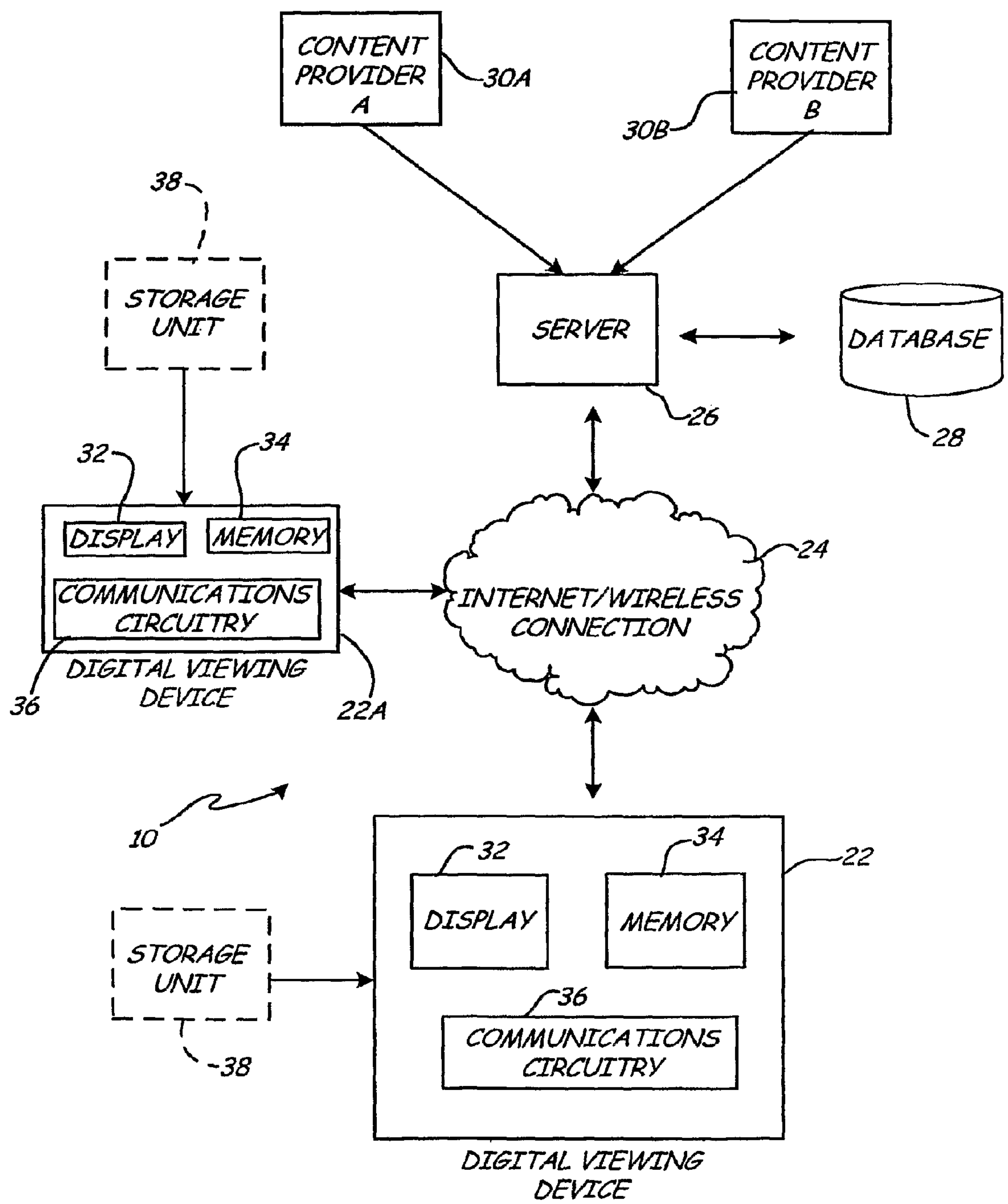
FIG. 1 is a block diagram of a Shuffle-Video system according to the present invention.

FIG. 1 is a block diagram showing an exemplary embodiment of a Shuffle-Video system 10 that involves generally centralized content storage. The Shuffle-Video system 10 shown in FIG. 1 includes a commercially available digital viewing device 22 (e.g., a cell phone or Internet device), an Internet/wireless connection 24, a server 26, a database 28, and one or more content providers (exemplary content providers 30A and 30B). The digital viewing device 22 and 22A includes a display 32, memory 34, and communications circuitry 36. The digital viewing device 22 will further have some controls (e.g., the display 32 can be a touch screen or be mouse-driven) for permitting user input. Content, that is, a stack of video clips, is provided by any of the content providers 30A and 30B (which can comprise servers) to the server 26, which can store the clips on the database 28 for later access. The server 26 associates the clips with particular stacks, and maintains a library of available stacks. In the embodiment shown in FIG. 1, the digital viewing device 22 can communicate with the server 26 via the Internet/wireless connection 26, and the database 28 is operably linked to the server 26. Stacks can be downloaded to the digital viewing device 22 from the server 26 for streaming-type viewing. Alternatively, one or more stacks of clips can be downloaded and stored in the memory 34 of the digital viewing device 22 on a short-term or long-term basis. The particular manner in which content is provided to the digital viewing device 22 can vary, depending on factors such as the capabilities of the digital viewing device 22 (e.g., available memory), the capabilities of the Internet/wireless connection 24 (e.g., available bandwidth), and the particular subscription (or service plan) options available to a user of the digital viewing device 22.

It is possible to utilize any number of digital viewing devices with the system 10. FIG. 1 also shows an exemplary second digital viewing device 22A, which is configured substantially identically to digital viewing device 22. The second digital viewing device 22A can communicate with both the server 26 and the digital viewing device 22 via the Internet/wireless connection 24. Each digital viewing device 22 and 22A can be associated with a single distinct user, such that multiple users can interact with the system 10. Although it should be recognized that the second digital viewing device 22A is optional.

It should be noted that the particular embodiment shown in FIG. 1 is provided merely by way of example, and not by way of limitation. It will be recognized that alternative system configurations are possible within the spirit and scope of the present invention. For instance, rather than centralized storage, stacks of clips can be stored on a stand-alone storage unit 38, like CDs, DVDs or Blu-ray® discs, and accessed directly by the digital viewing device 22 or 22A.

The "movies" generated by Shuffle-Video (see, e.g., FIG. 1) are completely fluid. There is no "correct" order to display the video clips in a given stack. Normally the "movie" has no plot. Any relationship between characters in the "movie" must generally be on-going, not initiated or terminated in any clip in a stack, because that clip might be last or first or in the middle of the "movie". Meeting, courting, marrying, and dying—characteristics of a logical, linear plot—will not normally be comprehensible if the various scenes are shuffled randomly. Thus, it is expected that most Shuffle-Video "movies" involving players/characters will be character rather than plot driven. Each of the clips in a stack will have an independent character value within the theme or category of the stack. Moreover, clips will generally not introduce elements that would be expected to appear or develop in other clips. In that sense, the types of clips suitable for use with the Video-Shuffling system 10 of the present invention are generally those that do not readily present a necessary viewing order for clips in a stack. As a further note, it is contemplated within the scope of the present invention that some stacks (or some clips within a stack) will not involve players or characters, for instance, those relating to language lessons or simple visual graphic scenes, all of which can be shuffled for display on the digital viewing device 22.

Because of the special, character-driven aspect of the video clips used in Shuffle-Video, the clips are generally unique to the system, rather than simply scenes cut from previously available commercial videos of a plot-driven nature. In most cases, it is expected that the clips will be short vignettes that are less than about a minute long. For example, a clip entitled "Tipping" has a man purchasing a cup of coffee from a clerk, and can be described as follows:

Man: "Would you like a tip?"

Clerk: "No. I'm trying to cut down. Would you like a tip?"

Man: "Sure."

Clerk: "All pain comes from wishing well for yourself All joy comes from wishing well for others."

Man: "That and coffee too! Very good, grasshopper."

End of clip.

In the clip "Tipping", a viewer (i.e., a shuffle-video system user) learns a little of both the Man and Clerk characters. The clip "Tipping" lasts about 15 seconds. When a stack includes multiple clips involving those characters, the Man and Clerk, they will encounter each other in other video clips. The "Tipping" clip might be first, last, or at any point in the viewing sequence of a given "movie".

The Table 1, below, provides some examples of the characteristics of clips suitable for use with the Shuffle-Video system 10.

TABLE 1

| Clip Description | Non-Plot-Driven Character Value |
|---|---|
| He and she have a conversation at a party. | Some relationship already exists. This isn't a first meeting, because it could be the last of several in a stack involving the couple. |
| He hits his thumb with a hammer. | We learn of him. But he doesn't get a blood blister or finish a tree house, either of which might be conspicuous in its absence in a "later" clip. |
| He and she have a fight. | Who doesn't? We learn a bit about them. But the clip isn't about a divorce, because it may appear before or after the clip where he and she have a conversation at a party. |
| She's sick. | Who doesn't get sick? We learn a bit about her. But she doesn't die. |
| He buys groceries. | We learn a bit about him. But if he makes a shopping list, that action occurs within this same clip. |

Stacks of video clips are made available to viewers who will be able to shuffle and see them in any order. As explained further below, viewers can have control over the viewing sequence, and can choose to have certain clips appear in a particular sequence. In this way viewers can play favorites among available video clips. Viewers can also choose to eliminate certain clips from their viewing stack. In this sense, viewers can force certain deviations from a truly random clip sequence.

Shuffling with Shuffle-Video will be within stacks, not between stacks. Shuffling video clips from unrelated stacks—an American coming-of-age stack, a Korean-language Anime stack, a Spanish-language soap opera stack, and a Italian Biblical stack—would likely be unsatisfying to viewers. Shuffling video clips within any of those stacks would likely be more satisfying to interested viewers. It is therefore contemplated that distinct stacks each having some common characters, theme, category of content, etc. will typically be supplied to viewers.

Stacks of video clips can be supplemented by updates or additional clips, which can add to and/or replace clips in a stack. Supplements can occur on a periodic basis (e.g., via a daily podcast) or at any time chosen by the viewer (i.e., on-demand). Stacks routinely supplemented may grow unwieldy. Viewers can create custom stacks by adding, eliminating or replacing clips. In that way, for example, viewers can choose to collect and store clips of different characters in a personalized library of stacks or cut off clips added to the stack before or after a given date.

Video clips that populate a given stack can be downloaded onto the viewer's digital viewing device 22 (e.g., as files are loaded onto iPod® devices via podcast) or can remain on the server 26 and be remotely accessed by viewers. If the video clips remain on a centralized server 26, the individual viewer's "library" information amounts to only a few bits of information: identifiers of the particular clips, not the clips themselves.

When any "movie" is generated or displayed, a record of the order in which clips were viewed is created and saved as a Sequence ID. That Sequence ID can be accessed so that viewers can re-view a particular sequence and/or share it with other viewers (e.g., by e-mailing or otherwise transmitting a Sequence ID between digital viewing devices 22 and 22A). The Sequence ID can be easily stored locally, on the viewer's digital viewing device 22, or remotely (e.g., on a centralized server 26).

Figure 2:
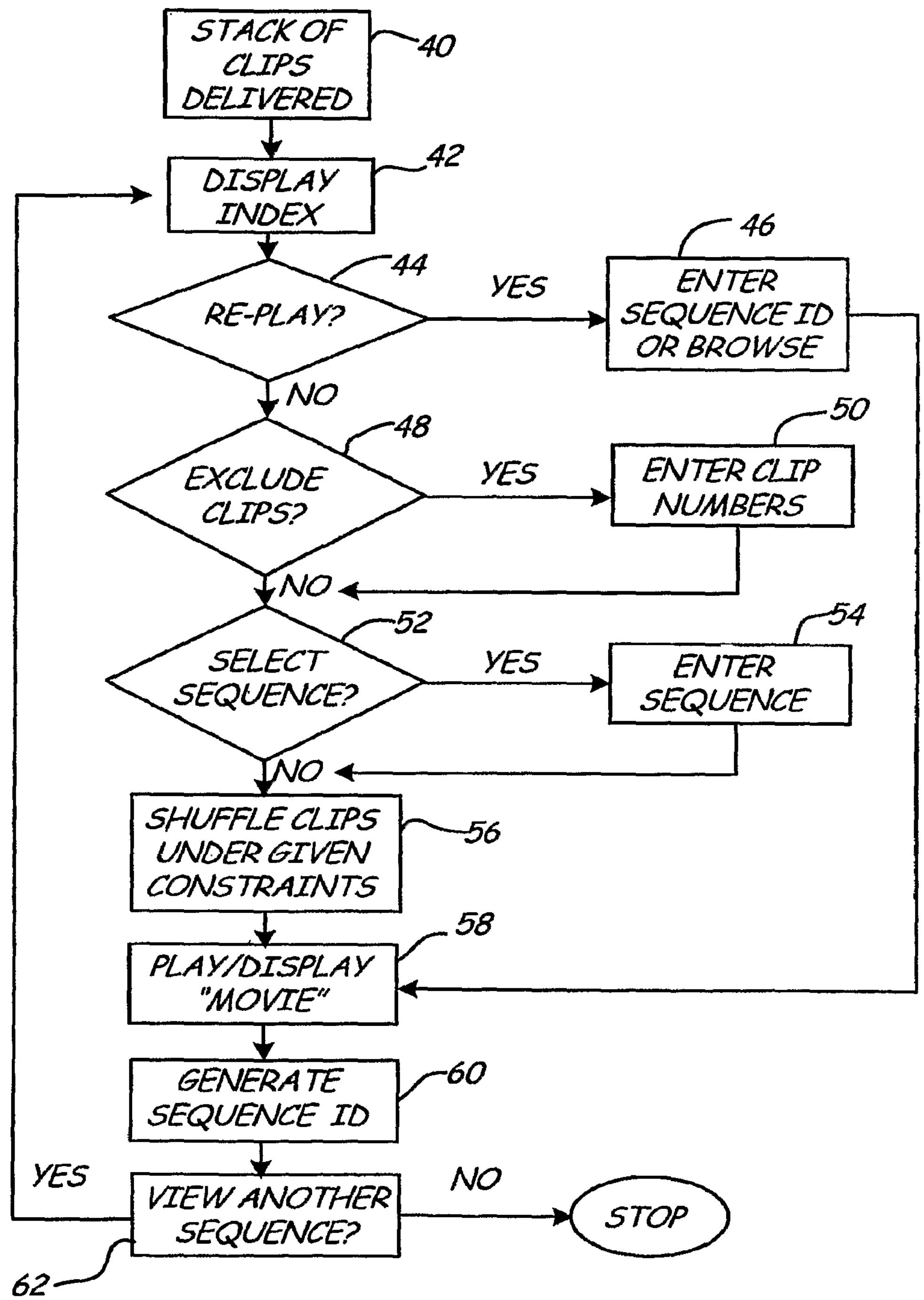
FIG. 2 is a flow chart illustrating a process for executing a Shuffle-Video "movie".

FIG. 2 is a flow chart illustrating a process used by the ultimate viewer for executing a Shuffle-Video "movie". FIGS. 3A-3G are schematic representations of various menu displays utilized for the process illustrated in the flow chart of FIG. 2. As shown in FIG. 2, a stack of video clips is first delivered to a digital viewing device (step 40). Viewers can purchase a fixed stack of video clips (e.g., a CD/DVD or computer download) and/or subscribe to a service that allows them to maintain a growing library of video clips. Thus, an initial stack might routinely be supplemented with additional video clips (e.g., a clip a day via a podcast). Clip/stack delivery can be an automatic process, or can involve decision and action by the user/viewer to select, access or otherwise obtain desired clips/stacks. Stacks of available clips are generally expected to grow over time. If viewers were subscribers to a periodic stack update service and got a new clip every day, a stack would soon potentially contain hundreds of clips.

As noted above, a stack of video clips may be downloaded onto the viewer's digital viewing device 22 (e.g., as files are loaded onto iPod(D devices) or may remain on a centralized server 26 and be remotely accessed by viewers for streaming or on-demand viewing. However, alternative systems for providing stacks of clips can be used.

Next, an Index of available clips is displayed (step 42). The available clips in the Index will correspond to a particular stack. When multiple stacks are available, menus or indexes for selecting a desired stack are initially provided (not shown). In the example illustrated in FIG. 3A, a stack is provided that includes twenty video clips each having a title. The stack can be stored in memory on a digital viewing device 22, or, alternatively, can be downloaded on demand from a server 26. The twenty titles for the clips appear as the Index. A stack of twenty video clips can be viewed in 2.4 quintillion (or 20!) different sequences. Thus, even if everyone on earth received a million stacks of the same twenty clips, it is possible that no two shuffled movies would be the same (i.e., each sequence would be different).

A prompt, such as that shown in FIG. 3B, is then provided to ask if the viewer would like to re-play a sequence (step 44). This prompt allows the viewer to re-play a particular sequence of clips (i.e., a particular "movie"). That particular sequence might be one the viewer has seen before, or one recommended by another viewer (e.g., a friend or someone else via an Internet posting). If the viewer selects "Yes" to the re-play question, a Sequence ID can be typed in or retrieved via a BROWSE function (step 46). A BROWSE function allows a user/viewer to view a personalized list stored locally or remotely, the Sequence ID list of another individual, or a general on-line sequence ID list posted by other users. The Sequence ID stores the particular order of clips presented in a particular "movie". The Sequence ID is a relatively small data file that merely contains reference information enabling future re-display of a particular "movie", but without requiring the actual content of the "movie" to be stored. After choosing to re-play a sequence and specifying a Sequence ID, the system 10 would begin the display process (i.e., skip to step 58 below).

Next, assuming that the user/viewer has not chosen to re-play a sequence, a prompt, such as that shown in FIG. 3C, allows the viewer to list video clips to be excluded from the viewing sequence (steps 48 and 50). In the example illustrated in FIG. 3C, the viewer has chosen three clips to eliminate: #6, "Waiting in Line"; #9, "Dream Sequence"; and #15, "Leslie" (the exemplary clip titles referenced hereinafter correspond to those shown in FIG. 3A). The viewer can have a variety of reasons for eliminating particular clips. Perhaps the eliminated clips involve a character the viewer dislikes, or are simply considered inferior. Perhaps, alternatively, the viewer wishes to limit the length of the resulting "movie". Furthermore, the ability of viewers to create custom or personalized stacks further expands on the viewer control offered by steps 48 and 50.

Next, as shown in FIG. 3D, the viewer is given the option of placing specific video clips in a particular order of viewing (steps 52 and 54). In the example illustrated in FIG. 3D, the viewer has chosen to put clip #19, "Happy Birthday (2nd Verse)" first, and clip #16, "Choir" last. Because three clips were previously eliminated, as described above with respect to steps 48 and 50, the ultimate "movie" will be 17 clips long.

If a stack of video clips had been routinely supplemented for some time, it can contain hundreds of clips. Not all of those clips would be expected to be included in every viewing. Thus, the shuffling routine can automatically limit the number of clips in a particular stack viewed to twenty, thirty, or some other number specified by the viewer. Those selected clips can be the most recent additions to the stack, or not. Even then, the viewer might choose to exclude certain clips, as with step 48. Similarly, a user might specify that certain clips, from perhaps hundreds available, be included in the upcoming viewing.

Having chosen which clips to eliminate (steps 48 and 50) and the order for a couple of particular scenes (steps 52 and 54), the viewer then selects SHUFFLE and the remaining clips are randomly assigned viewing slots (step 56, as shown if FIG. 3E). The randomization of the viewing slot assignments can be performed by a suitable random number or quasi-random number generator algorithm.

Selecting PLAY begins the display of the "movie" (step 58). As illustrated in FIG. 3F, seven clips have already been viewed, starting with clips #19, through #1. The line through these clip numbers indicates that they have been viewed. It should be further noted that in alternative embodiments, PLAY can be selected at any point from step 42 through step 56. For example, pressing PLAY at step 42 could essentially simultaneously cause random assignments of viewing slots and the initiation of the display of the resulting "movie" (i.e., without eliminating any video clips, assigning other clips to particular slots or requiring the user to explicitly select SHUFFLE).

Additional display functions can be provided, such as STOP, PAUSE, RESUME, FAST-FORWARD, REVERSE and/or other conventional video display functions.

When the full stack has been viewed (or when a STOP function has been triggered mid-sequence), a Sequence ID is created, displayed (as shown in FIG. 3G) and stored (step 60). The Sequence ID stores the particular order of clips presented in the "movie" generated in step 58. The viewer is then given the option to view another sequence (step 62), and can return to step 42 if desired.

There is no "correct" order to display the video clips in the stack. The viewer is able to shuffle the stack randomly; hold particular clips in any spot in the viewing order; and eliminate clips from viewings, or keep them from being eliminated. Those actions can be accomplished by interaction with a menu system of the digital viewing device 22, such as a menu system similar to that described with respect to FIGS. 2 and 3A-3G.

It should be recognized that the steps and displays shown in and described with respect to FIGS. 2 and 3A-3G are merely exemplary, and can vary in alternative embodiments. For instance, a digital viewing device with a relatively small display screen 32 (e.g., a cell phone) would generally include a less expansive menu, but the process would be essentially the same.

Although the present invention has been described with reference to preferred embodiments, workers skilled in the art will recognize that changes may be made in form and detail without departing from the spirit and scope of the invention.

The invention claimed is:

1. A video system comprising:

a digital viewing device having a display:

a plurality of discrete video clip that are each associated with a first stack, wherein all of the video clips associated with the first stack have at least one common value selected from the group consisting of character, theme and category, but are unrelated to each other in terms of plot, and wherein associations of each of the video clips with the first stack are selectively defined using the digital viewing device;

a first video clip display sequence defining a first order for sequential display of the video clips in the first order for sequential display is determined substantially randomly by the digital viewing device; and means for adding an additional video clip to a first stack automatically on a subscription basis.

2. A video system comprising:

a digital viewing device having a display;

a plurality of discrete video clips that are each associated with a first stack, wherein all of the video clips associated with the first stack have at least one common value selected from the group consisting of character, them and category, but are unrelated to each other in terms of plot, and wherein associations of each of the video clips with the first stack are selectively defined using the digital viewing device;

a first video clip display sequence defining an a first order for sequential display of the video clips in the first stack on the display of the digital viewing device, wherein at least a portion of the first order for sequential display is determined substantially randomly by the digital viewing device; and a playlist, wherein the first stack is controllably defined by the playlist such that the first video clip display sequence excludes at least one otherwise available video clip from the first stack.

3. The system of claim 1 and further comprising:

a content provider for providing each of the video clips in the first stack; and a server for delivering the video clips in the first stack from the content provider to the digital viewing device through a networked environment, wherein the video clips in the first stack are stored in a centralized database and delivered to the digital viewing device in a streaming fashion.

4. The system of claim 1, wherein the video clips in the first stack are stored on the digital viewing device.

5. The system of claim 1, wherein the video clips in the first stack are stored on the digital viewing device.

6. The system of claim 1, wherein the digital viewing device comprises a cellular phone.

7. The system of claim 1, wherein the video clips in the first stack are sequentially displayed on the display of the digital viewing device according to the first video clip display sequence substantially without interruption between displayed video clips, thereby generating a movie.

8. The system of claim 1 and further comprising: means for adding an additional video clip to the first stack on a discrete purchase basis.

9. The system of claim 1 and further comprising:

means for excluding one or more selected video clips in the first stack from the video clip display sequence.

10. The system of claim 1 and further comprising:

means for guaranteeing the inclusion of one or more selected video clips in the first stack in the first video clip display sequence.

11. The system of claim 1 and further comprising:

means for assigning one or more selected video clips in the first stack, but less than all of the video clips in the first stack, to particular ordered positions within the first video clip display sequence.

12. The system of claim 1 and further comprising:

means for storing the first video clip display sequence and for selectively recalling the stored video clip display sequence.

13. The system of claim 12 and further comprising:

means for communicating the stored first video clip display sequence to another digital viewing device via the Internet.

14. The system of claim 1, wherein each of the video clips in the first stack is less than about one minute in duration.

15. The system of claim 1 and further comprising:

a plurality of discrete video clips that are each associated with a second stack, wherein each of the video clips in the first stack is distinguishable from each of the video clips in the second stack; and means for selecting one of the first or second stacks for display on the digital viewing device.

16. The system of claim 2 and further comprising:

a content provider for providing each of the video clips in the first stack; and a server for delivering the video clips in the first stack from the content provider to the digital viewing device through a networked environment, wherein the video clips in the first stack are stored in a centralized database and delivered to the digital viewing device in a streaming fashion.

17. The system of claim 2, wherein the video clips in the first stack are stored on the digital viewing device.

18. The system of claim 2, wherein the digital viewing device comprises a cellular phone.

19. The system of claim 2, wherein the video clips in the first stack are sequentially displayed on the display of the digital viewing device according to the first video clip display sequence substantially without interruption between displayed video clips, thereby generating a movie.

20. The system of claim 2 and further comprising:

means for adding an additional video clip to the first stack automatically on a subscription basis.

* * * * *